United States Patent [19]
Bell et al.

[11] 3,949,972
[45] Apr. 13, 1976

[54] DIRECT ACTING HYDRAULIC DUST STOP

[75] Inventors: Wilson A. Bell, Southbury; Douglas W. MacLeod, Oxford, both of Conn.

[73] Assignee: USM Corporation, Boston, Mass.

[22] Filed: July 2, 1975

[21] Appl. No.: 592,763

[52] U.S. Cl. ............... 259/104; 277/16; 277/81 R
[51] Int. Cl.² .................. B01F 7/08; F16J 15/28
[58] Field of Search ............. 259/104, 105, DIG. 16; 277/81, 91, 16

[56] References Cited
UNITED STATES PATENTS
| | | | |
|---|---|---|---|
| 2,170,303 | 8/1939 | Helstrup | 259/104 |
| 3,702,691 | 7/1971 | Fritsch | 259/104 |
| 3,774,889 | 11/1973 | Guary | 259/DIG. 16 |

FOREIGN PATENTS OR APPLICATIONS
| | | | |
|---|---|---|---|
| 736,376 | 6/1966 | Canada | 259/DIG. 16 |
| 703,636 | 2/1965 | Canada | 259/DIG. 16 |

Primary Examiner—Robert I. Smith
Attorney, Agent, or Firm—Ralph D. Gelling; Vincent A. White; Richard B. Megley

[57] ABSTRACT

Four hydraulic cylinders are mounted on support segments at approximately 90° intervals about the sealing gland ring of an internal rotary mixer. The piston rods of the hydraulic cylinders directly engage the gland ring and the cylinders are supplied by a static hydraulic system. The hydraulic system supplies a pair of cylinder assemblies on either end of the rotor shaft thereby providing a continuously balanced force to the gland rings.

1 Claim, 5 Drawing Figures

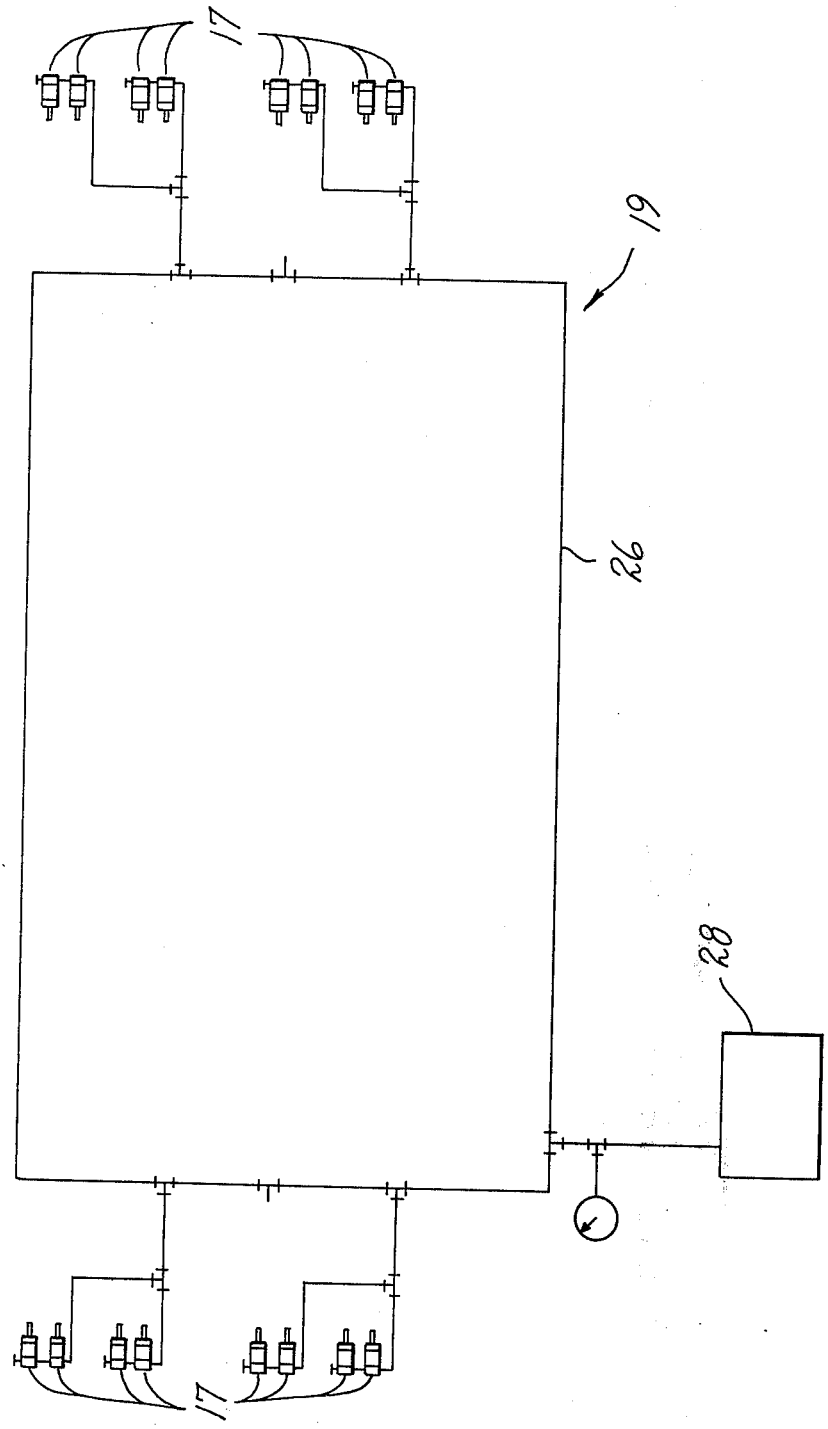

DIRECT ACTING HYDRAULIC DUST STOP

BACKGROUND OF THE INVENTION

Rotary mixers of the type involved with this invention generally include a body forming an internal mixing chamber within which one or more rotors operate. The rotors are mounted on axial shafts which extend through the body at each end thereof for external journaling. The materials being mixed may produce a large amount of very fine dust in the chamber. In order to prevent this dust from escaping from the chamber, through the rotor shaft openings in the body, an annular sealing assembly is constructed in the shaft openings.

Conventionally the sealing assembly consists of a gland ring, a backing ring, and a yoke. The yoke is attached to the body by means which provide a fulcrum for the lever action of the yoke. One end of the yoke is attached to the backing ring at points approximately 180° apart, while the other end is operatively connected to an hydraulic cylinder which when actuated pivots the yoke on its fulcrum. The lever action of the yoke transmits the force of the cylinder to the backing ring, which in turn applies the force to the gland ring. The gland ring engages a surface of the rotor resulting in a seal which is under continuous pressure from the hydraulic cylinder. When it is desired to clean the sealing assembly, this pressure may be released thereby freeing the gland ring to allow the mixing chamber to be purged.

This type of sealing assembly is adequate for small mixers, however as the mixers become larger the yoke becomes extremely cumbersome and difficult to construct. The sealing gland rings are also larger and therefore require additional points at which the sealing force should be applied. Therefore the indirect application of the sealing force through the yoke is no longer effective. It is the object of this invention to provide an apparatus for applying the sealing force directly to the gland ring.

BRIEF DESCRIPTION OF THE INVENTION

The sealing assembly of this invention consists of a conventional annular sealing gland and a pair of cylinder support segments which are fixed to the body of the internal mixer. Mounting flanges are provided on the support segments to accommodate the hydraulic cylinders. The piston rods of the cylinder engage the gland ring directly. The cylinders may be mounted on the support segments at intervals of 90°, 60° or at smaller intervals depending on the circumference of the sealing gland ring. Each end of the rotor is equipped with this sealing assembly and each of the cylinders at both ends of the rotor are supplied by a common static hydraulic source, thereby providing a balanced force which is continually applied to each sealing gland ring.

BRIEF DESCRIPTION OF THE DRAWING

This invention is more fully described with reference to the attached drawing, which shows a preferred embodiment of the invention and in said drawing:

FIG. 5 is a schematic diagram of the hydraulic system of the invention.

DETAILED DESCRIPTION OF THE INVENTION

Figure 1:
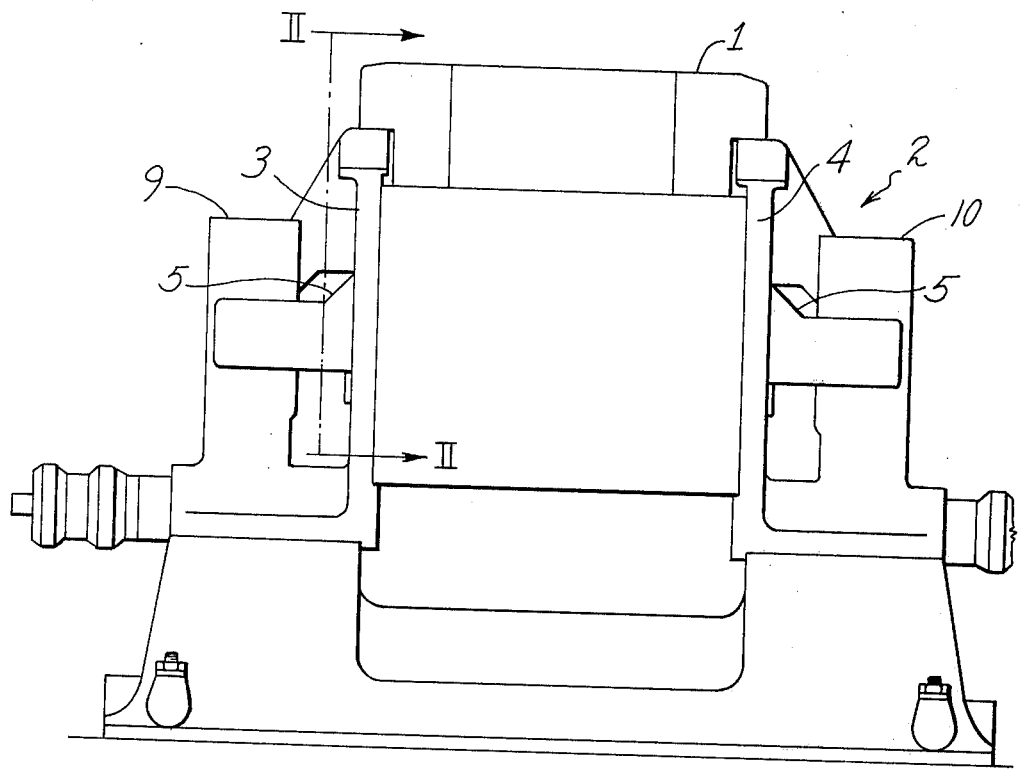
FIG. 1 is a plan view of an internal mixer of the type associated with this invention.
Figure 2:
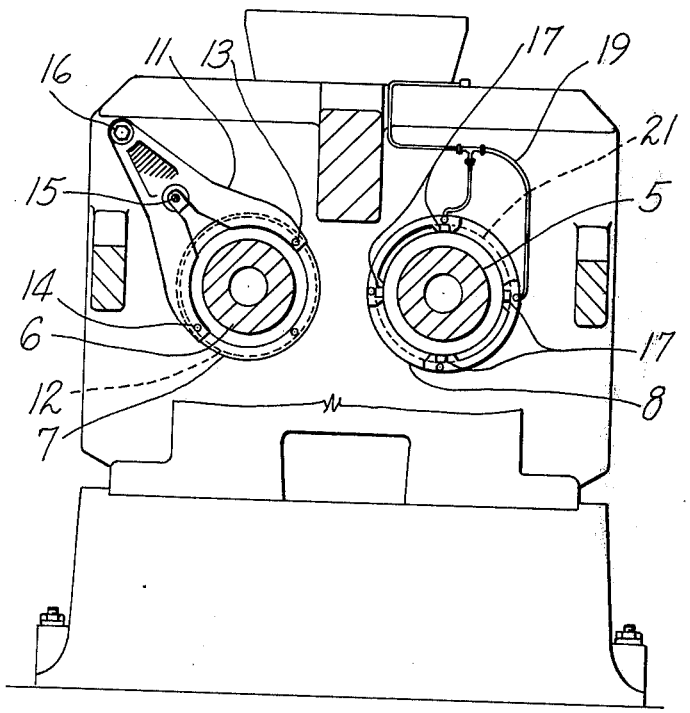
FIG. 2 is a sectional view of the internal mixer taken along section lines A—A and showing the dust stop arrangement of the prior art and according to this invention.

The invention is for use in an internal rotary mixer as shown in FIGS. 1 and 2. The mixer has a mixing chamber 1 basically formed by body 2 and end plates 3 and 4. Within the chamber there is located a pair of rotors (not shown) mounted on shafts 5 and 6 which extend through openings 7 and 8 in end plates 3 and 4. The rotor shafts are journaled at housings 9 and 10 for rotation caused by an appropriate driver.

To illustrate the prior art a yoke type dust stop assembly is shown in FIG. 2 associated with the shaft opening 7. A yoke 11 is attached to end ring 12 at points 13 and 14 and is pivotally mounted on mixer end plate 3 at point 15. An actuating hydraulic cylinder 16 is mounted at the end of the yoke 11 to provide a lever action which transmits the force exerted by cylinder 16 to the end ring 12. Pressure is thereby exerted on the gland ring which is forced into sealing engagement with a surface of the rotor.

The dust stop assembly of this invention is shown in FIG. 2 in association with shaft opening 8. Hydraulic cylinders 17 are mounted on support segments 18 and supplied with hydraulic fluid through system 19.

Figure 3:
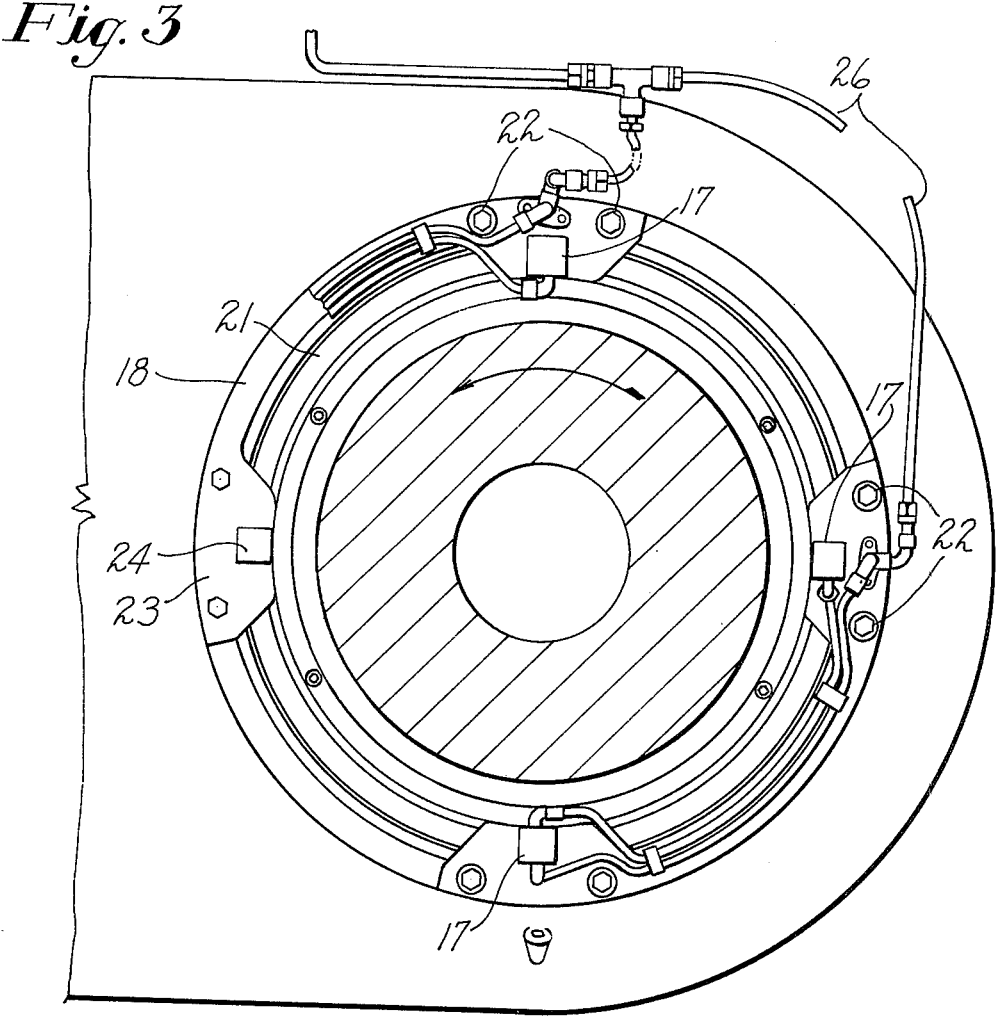
FIG. 3 is an end view of the rotor shaft showing the dust stop assembly of the invention, the hydraulic system being partially cut away to show the cylinder support segment.
Figure 4:
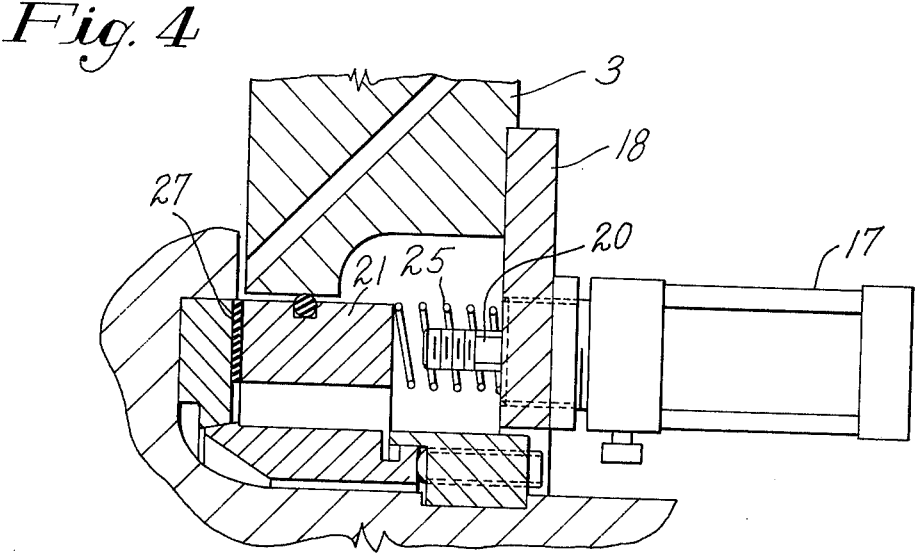
FIG. 4 is a sectional view of the dust stop assembly showing the relationship between rotor, gland ring, and piston rod.

As best shown in FIGS. 3 and 4, the cylinders 17 have piston rods 20 extending outward to contact gland ring 21. Support segments 18 are fixed to the mixer body end plate 3 by bolts 22 and are constructed with flanges 23 which have openings 24 therein to receive cylinders 17. The flanges are located to provide a platform for the cylinder operation against the gland ring 21. The gland ring 21 is biased towards the mixing chamber 2 by spring 25. The hydraulic system 19 is connected to the cylinders 17 through tubing 26. This system 19 is best shown in the schematic diagram of FIG. 5. The instant system supplies 8 cylinders consisting of four per dust stop assembly and is charged by pressure source 28 to a predetermined pressure after which it closed in order to render the system substantially static.

In operation the gland ring 21 is forced into sealing engagement with the surface 27 of the rotor by the force of cylinder 17 exerted by piston rod 20. Since the shaft 5 is subject to significant axial and bending forces, there will be movement of the shaft in the opening 7. The forces exerted on the gland ring will therefore, vary as the shaft flexes and slides. However, since the hydraulic system is a closed static circuit, the changes at one end of the shaft 5 will automatically be reflected at the opposite end.

Although the embodiment shown contains 4 cylinders arranged about the dust stop assembly at approximately 90° intervals any number of cylinders could be used without appreciably adding to the complexity of the system. In this manner a simpler and more flexible assembly is provided.

Having thus described our invention, what we claim as new and desire to secure by Letters Patent of the United States is:

1. In an internal rotary mixer, having rotor shafts which extend through openings in the mixer body to be journaled on the exterior thereof, a dust stop assembly for sealing the shaft openings comprising:
   A. A pair of sealing gland rings situated in the shaft openings for sealing engagement with each end of the rotor;
   B. Bearing surfaces on each end of the rotor for engagement with the sealing gland rings;
   C. Cylinder support segments fixed to the mixer body, at the shaft openings and having flanges which are constructed to receive hydraulic cylinders;
   D. Hydraulic cylinders mounted on the flanges of the cylinder support segments with the piston rods thereof in direct operative contact with the sealing gland rings; and
   E. A static source of hydraulic fluid connected to supply the hydraulic cylinders at each end of the rotor, thereby providing a balanced force on each of the gland rings.

* * * * *